United States Patent
Lee et al.

(10) Patent No.: US 9,088,932 B2
(45) Date of Patent: *Jul. 21, 2015

(54) METHOD FOR PROCESSING PAGING INFORMATION IN A WIRELESS MOBILE COMMUNICATION SYSTEM

(75) Inventors: Young-Dae Lee, Gyeonggi-do (KR); Sung-Duck Chun, Gyeonggi-do (KR); Myung-Cheul Jung, Seoul (KR); Sung-Jun Park, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 508 days.

This patent is subject to a terminal disclaimer.

(21) Appl. No.: 12/721,517

(22) Filed: Mar. 10, 2010

(65) Prior Publication Data

US 2010/0167750 A1 Jul. 1, 2010

Related U.S. Application Data

(63) Continuation of application No. 12/092,056, filed as application No. PCT/KR2006/004371 on Oct. 25, 2006, now Pat. No. 7,826,859.

(30) Foreign Application Priority Data

Oct. 31, 2005 (KR) .................. 10-2005-0103510

(51) Int. Cl.
*H04W 68/00* (2009.01)
*H04W 48/12* (2009.01)
*H04W 72/00* (2009.01)

(52) U.S. Cl.
CPC ............ *H04W 48/12* (2013.01); *H04W 72/005* (2013.01)

(58) Field of Classification Search
CPC . H04W 24/10; H04W 72/04; H04W 72/0413; H04W 72/042; H04W 72/02; H04W 24/02; H04W 72/12; H04W 74/04; H04W 74/0833; H04W 84/047; H04W 68/025; H04W 68/02; H04W 72/005; H04W 52/0216; H04W 48/12; H04W 76/002; H04W 76/048; H04W 92/12; H04L 5/0053; H04L 5/0048; H04L 5/0073; H04L 5/0094; H04L 1/00; H04L 5/0091; H04L 25/03866; H04L 5/0007; H04L 5/006

USPC ......... 370/329, 389, 252, 336, 458, 351, 315, 370/390, 312, 320, 332, 335, 352; 455/458, 455/403, 455, 567, 450, 452.1, 67.11, 423, 455/517, 558, 515, 522, 69; 342/368, 372; 375/316, 267, 219, 340; 714/746, 748, 714/799

See application file for complete search history.

(56) References Cited

U.S. PATENT DOCUMENTS 5,530,736 A * 6/1996 Comer et al. ................. 455/458
6,111,865 A 8/2000 Butler et al.

(Continued)

FOREIGN PATENT DOCUMENTS

CN 1371576 9/2002
EP 1553798 7/2005

(Continued)

OTHER PUBLICATIONS

Nokia, "On the DL frequency resource block dimensioning", R1-051091, 3GPP TSG RAN WG1 Meeting #42bis, Oct. 2005, 4 pages, XP50100706.

(Continued)

*Primary Examiner* — Fred Casca
(74) *Attorney, Agent, or Firm* — Lee, Hong, Degerman, Kang & Waimey

(57) ABSTRACT

In a wireless mobile communications system, a method for processing paging information allows the operations of a mobile terminal to be simplified and permits efficient use of resources for the mobile terminal. The network instructs in advance, the transmission of control information, such as a particular paging message, a notification message, system information and the like, via a single indicator channel. The mobile terminal receives this single indicator channel and uses the indicator information that was transmitted via the indicator channel in order to receive the control information.

8 Claims, 4 Drawing Sheets

(56) References Cited

U.S. PATENT DOCUMENTS

| | | | |
|---|---|---|---|
| 6,275,487 B1 | 8/2001 | Szalajski et al. | |
| 6,628,946 B1 | 9/2003 | Wiberg et al. | |
| 2002/0085491 A1* | 7/2002 | Beshai et al. | 370/230 |
| 2002/0123358 A1 | 9/2002 | Butler et al. | |
| 2003/0012173 A1 | 1/2003 | Rune | |
| 2005/0047429 A1* | 3/2005 | Koo et al. | 370/447 |
| 2005/0153715 A1* | 7/2005 | Hwang et al. | 455/458 |
| 2005/0157679 A1* | 7/2005 | Dulin et al. | 370/330 |
| 2005/0177623 A1 | 8/2005 | Roberts et al. | |
| 2005/0271007 A1* | 12/2005 | Hwang et al. | 370/329 |
| 2006/0077947 A1* | 4/2006 | Kim et al. | 370/349 |
| 2006/0148493 A1* | 7/2006 | Narasimha et al. | 455/458 |

FOREIGN PATENT DOCUMENTS

| | | |
|---|---|---|
| JP | 07-162948 | 6/1995 |
| JP | 08-509340 | 10/1995 |
| JP | 11-046162 | 2/1999 |
| KR | 10-2005-0084908 | 8/2005 |
| RU | 2256291 | 3/2003 |
| WO | 00/72609 | 11/2000 |
| WO | 2004/017541 | 2/2004 |
| WO | 2004/089013 | 10/2004 |
| WO | 2004/100598 | 11/2004 |
| WO | 2005050875 | 6/2005 |

OTHER PUBLICATIONS

European Patent Office Application Serial No. 06812213.4, Search Report dated Oct. 19, 2012, 12 pages.

Onoe, et al., "Control Channel Structure for TDMA Mobile Radio Systems", IEEE, May 1990, 6 pages.

European Patent Office Application Serial No. 06812213.4, Certificate dated Dec. 25, 2013, 9 pages.

Onoe, S. et al., "Control Channel Structure for TDMA Mobile Radio Systems," Vehicular Technology Conference, 1990 IEEE 40th, May 6-9, 1990.

* cited by examiner

METHOD FOR PROCESSING PAGING INFORMATION IN A WIRELESS MOBILE COMMUNICATION SYSTEM

This is a continuation application of U.S. patent application Ser. No. 12/092,056, filed on Apr. 29, 2008, now U.S. Pat. No. 7,826,859, which is the National Stage filing under 35 U.S.C. 371 of International Application No. PCT/KR2006/004371, filed on Oct. 25, 2006, which claims the benefit of earlier filing date and right of priority to KR Patent Application No. 10-2005-0103510, filed on Oct. 31, 2005, the contents of which are all hereby incorporated by reference herein in their entirety.

TECHNICAL FIELD

The present invention relates to wireless (radio) mobile communication systems, and in particular, relates to a method for processing paging information allows the operations of a mobile terminal to be simplified and permits efficient use of resources for the mobile terminal

BACKGROUND ART

To support broadband wireless (e.g., WiMAX) access, there are different types of broadband wireless air interfaces, such as cellular 3G technologies (e.g., UMTS, WCDMA, etc.), and multi-carrier based multiple access techniques (e.g., OFDMA, OFDM-TDMA, OFDM-CDMA, etc.). Frequency division multiplexing involves sub-channelization, of which at least four types (OFDM, Flash OFDM, sOFDMA and OFDMA) exist.

Orthogonal Frequency Division Multiplexing (OFDM) involves the splitting of a radio signal into multiple smaller sub-signals that are then transmitted simultaneously at different frequencies to a receiver. OFDM refers to a form of multi-carrier transmission where all the sub-carriers are orthogonal to each other. Certain IEEE standards and 3GPP standards are related to various aspects of OFDM.

FIGS. 1 and 2 show a typical frame that is used in OFDM. One frame has a time duration of 10 ms (milliseconds) and consists of 20 sub-frames, each having a time duration of 0.5 ms. Each sub-frame may consist of a resource block (RB) that contains data or information, and a cyclic prefix (CP) that is a guard interval needed for conventional OFDM modulation (but not needed for OFDM with pulse shaping, i.e., OFDM/OQAM). The sub-frame duration corresponds to the minimum downlink TTI (Transmission Time Interval).

FIG. 3 shows a basic downlink reference-signal structure consisting of known reference symbols. Namely, a mapping of physical channel symbols in frequency domain is shown. In other words, channel-coded, interleaved, and data-modulated information (i.e., Layer 3 information) is mapped onto OFDM time/frequency symbols. The OFDM symbols can be organized into a number (M) of consecutive sub-carriers for a number (N) of consecutive OFDM symbols.

Here, it is assumed that 7 OFDM symbols exist per sub-frame (when the CP length is short). In case of a long CP or a different frame structure, this basic downlink reference-signal structure would be slightly different.

Reference symbols (i.e., first reference symbols) are located in the first OFDM symbol of every sub-frame assigned for downlink transmission. This is valid for both FDD and TDD, as well as for both long and short CP. Additional reference symbols (i.e., second reference symbols) are located in the third last OFDM symbol of every sub-frame assigned for downlink transmission. This is the baseline for both FDD and TDD, as well as for both long and short CP. However, for FDD, an evaluation of whether the second reference symbols are need should be made.

FIG. 4 shows an exemplary structure of an Evolved Universal Mobile Telecommunications System (E-UMTS). The E-UMTS system is a system that has evolved from the UMTS system, and its standardization work is currently being performed by the 3GPP standards organization.

The E-UMTS network generally comprises at least one mobile terminal (i.e., user equipment: UE), base stations (i.e., Node Bs), a control plane server (CPS) that performs radio (wireless) control functions, a radio resource management (RRM) entity that performs radio resource management functions, a mobility management entity (MME) that performs mobility management functions for a mobile terminal, and an access gateway (AG) that is located at an end of the E-UMTS network and connects with one or more external networks. Here, it can be understood that the particular names of the various network entities are not limited to those mentioned above.

The various layers of the radio interface protocol between the mobile terminal and the network may be divided into L1 (Layer 1), L2 (Layer 2), and L3 (Layer 3) based upon the lower three layers of the Open System Interconnection (OSI) standard model that is known the field of communication systems. Among these layers, a physical layer that is part of Layer 1 provides an information transfer service using a physical channel, while a Radio Resource Control (RRC) layer located in Layer 3 performs the function of controlling radio resources between the mobile terminal and the network. To do so, the RRC layer exchanges RRC messages between the mobile terminal and the network. The functions of the RRC layer may be distributed among and performed within the Node B, the CPS/RRM and/or the MME.

FIGS. 5 and 6 show an exemplary architecture of the radio interface protocol between the mobile terminal and the UTRAN (UMTS Terrestrial Radio Access Network). The radio interface protocol of FIGS. 5 and 6 is horizontally comprised of a physical layer, a data link layer, and a network layer, and vertically comprised of a user plane for transmitting user data and a control plane for transferring control signaling. The radio interface protocol layer of FIGS. 5 and 6 may be divided into L1 (Layer 1), L2 (Layer 2), and L3 (Layer 3) based upon the lower three layers of the Open System Interconnection (OSI) standards model that is known the field of communication systems.

Particular layers of the radio protocol control plane of FIG. 5 and of the radio protocol user plane of FIG. 6 will be described below. The physical layer (i.e., Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The MAC layer of Layer 2 provides services to a radio link control (RLC) layer (which is a higher layer) via a logical channel. The RLC layer of Layer 2 supports the transmission of data with reliability. It should be noted that the RLC layer in FIGS. 5 and 6 is depicted in dotted lines, because if the RLC functions are implemented in and performed by the MAC layer, the RLC layer itself may not need to exist. The PDCP layer of Layer 2 performs a header compression function that reduces unnecessary control information such that data being transmitted by employing Internet protocol (IP) packets, such as IPv4 or IPv6, can be efficiently sent over a radio (wireless) interface that has a relatively small bandwidth.

The radio resource control (RRC) layer located at the lowermost portion of Layer 3 is only defined in the control plane, and handles the control of logical channels, transport channels, and physical channels with respect to the configuration, re-configuration and release of radio bearers (RB). Here, the RB refers to a service that is provided by Layer 2 for data transfer between the mobile terminal and the UTRAN.

As for channels used in downlink transmission for transmitting data from the network to the mobile terminal, there is a broadcast channel (BCH) used for transmitting system information, and a shared channel (SCH) used for transmitting user traffic or control messages. As for channels used in uplink transmission for transmitting data from the mobile terminal to the network, there is a random access channel (RACH) used for transmitting an initial control message, and a shared channel (SCI-I) used for transmitting user traffic or control messages.

One function implemented in 3GPP systems is a paging procedure. The paging procedure is necessary for converting the UE from idle mode into active mode. This procedure is implemented via a paging control channel (PCCH), a paging channel (PCH), a secondary common control physical channel (S-CCPCH), and a paging indicator channel (PICH). The paging procedure utilizes two different types of data (or signals), namely, a paging indicator (PI) and substantive paging data. The PI is sent on a paging indicator channel (PICH) in advance of the substantive paging data. The substantive paging data is sent on a separate paging channel (PCH), which is transported by a Secondary Common Control Physical Channel (SCCPCH).

DISCLOSURE OF INVENTION

Technical Problem

Before sending data to a particular mobile terminal, the network transmits a paging message on the downlink in order to determine the particular cell that the UE is located in. In the related art paging message transmitting method, an indicator (which informs in advance that a paging message will be transmitted) is transmitted through a separate (distinct) channel, such as a paging indicator channel. Additionally, an indicator (which informs in advance that a notification message for a multicast and broadcast service will be transmitted) is also transmitted through a separate (distinct) channel. In addition to these channels, the mobile terminal must also receive other channels, such as a broadcast channel used to periodically transmit system information. As there are a large total number of channels that a mobile terminal should receive due to transmissions through separate (distinct) channels according to each type of purpose, problems related to more complicated mobile terminal operations and a waste of mobile terminal resources occur.

Technical Solution

The present invention has been developed in order to solve the above described problems of the related art. As a result, the present invention provides a method for processing paging information such that the operations of a mobile terminal can be simplified and permits efficient use of resources for the mobile terminal.

MODE FOR THE INVENTION

Figure 1:
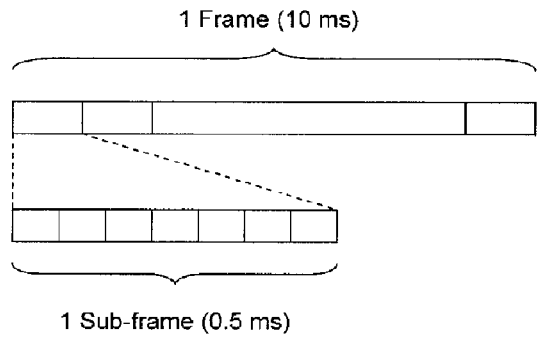
FIG. 1 shows an exemplary structure of one frame used in OFDM.
Figure 2:
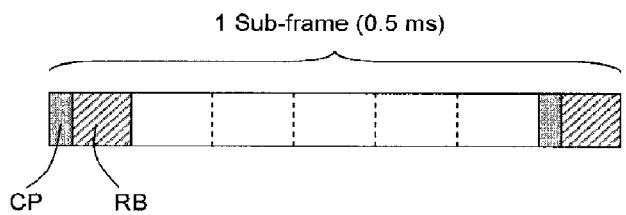
FIG. 2 shows an exemplary structure of one sub-frame within the frame of FIG. 1.
Figure 3:
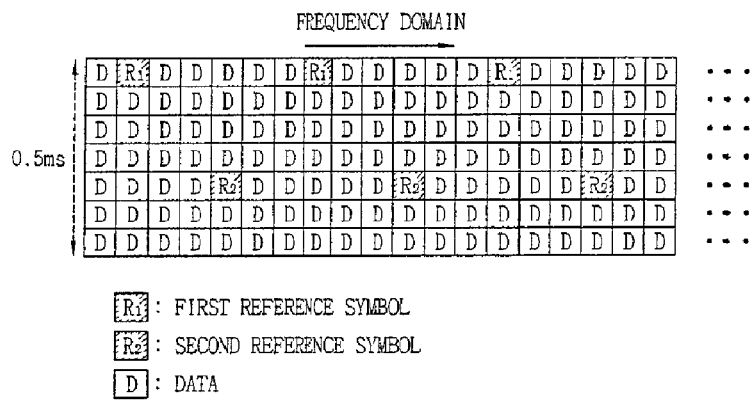
FIG. 3 shows an example of how data and reference symbols for OFDM may be expressed in the frequency domain and the time domain.
Figure 4:
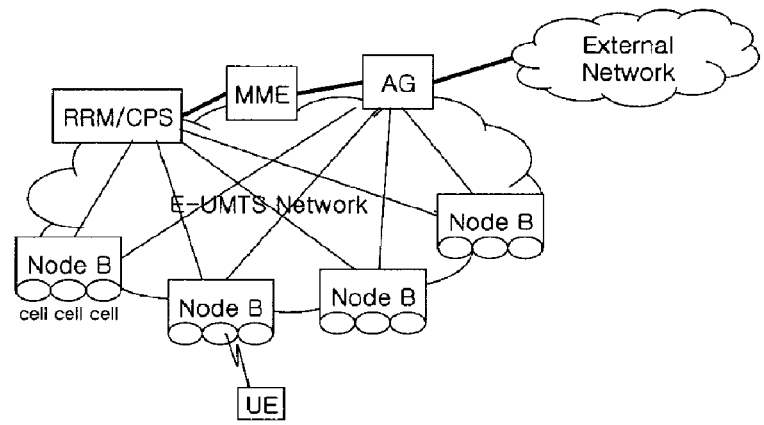
FIG. 4 shows an overview of a E-UMTS network architecture.
Figure 5:
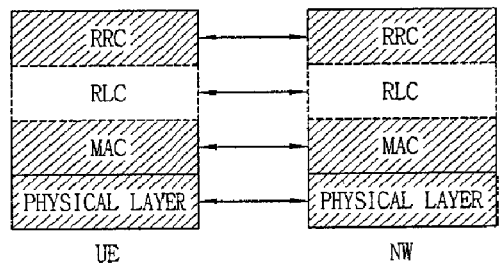
FIGS. 5 and 6 show an exemplary structure (architecture) of a radio interface protocol between a mobile terminal and a UTRAN according to the 3GPP radio access network standard.
Figure 6:
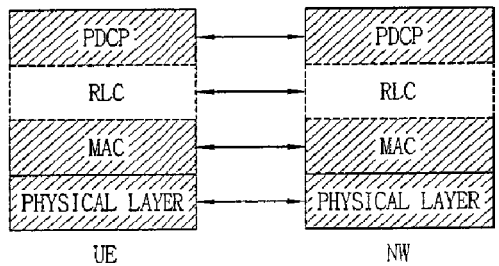

One aspect of the present invention is the recognition by the present inventors regarding the problems and drawbacks of the related art described above and explained in more detail hereafter. Based upon such recognition, the features of the present invention have been developed.

In the related art, it can be said that the system information is always fixed or non-flexible. Such fixed format allows a mobile terminal to easily detect and properly read the system information transmitted from the network.

In contrast, the features of the present invention allow at least some portions of the system information to be dynamically (or flexibly) changed. Appropriate indicators are included such that a mobile terminal can properly detect and read the dynamic (flexible) system information. As a result, further system information may be added as desired in order to support technical evolution and advancements, which thus allows for future enhancements or continued expansion of currently used system information.

It should be noted that the features of the present invention are related to issues regarding the long-term evolution (LTE) of the 3GPP standard. As such, the 3GPP TS 25.813 (LTE TR) and its related sections or portions thereof, as well as various developing enhancements thereof pertain to the present invention. Such enhancements and evolution have resulted in the use of a particular prefix (the letter E) when labeling various network entities (e.g., eNode B), protocol layers, channels, and the like. However, it can be clearly understood that such labeling and other terminology are merely exemplary and thus may be altered (or later clarified) as a result of ongoing or future discussions.

First, with respect to the features of the present invention, certain aspects regarding the paging procedure will be explained below.

In idle mode, the UE needs to complete a periodical supervision procedure in order to monitor the paging channel. Upon receiving paging information related to the UE itself, the UE then changes into active mode and receives paging from the network. The monitoring in the periodical supervision procedure is realized through the monitoring of a paging indicator (PI). The paging indicator is sent once via paging indicator channel (PICH) in every cycle.

When the RRC layer of the UE and the RRC layer of the UTRAN are connected to transmit and receive an RRC message between one another, the UE is considered to be in an RRC connected state. When they are not connected, the UE is considered to be in an idle state.

When in the RRC-connected state, the UE can be divided into a URA_PCH state, a CELL_PCH state, a CELL_FACH state, and/or a CELL_DCH state. In particular, when the UE is in idle state (in addition to the URA_PCH state and the CELL_PCH state), it wakes up only at each discontinuous reception (DRX) cycle to receive a PICH (Paging Indicator Channel) transmitting paging information, in order to reduce power consumption.

When in URA_PCH state or CELL_PCH state, the UE receives and stores a UTRAN specific DRX cycle length, and discontinuously receives the PICH according to the UTRAN specific DRX cycle length.

In addition, in idle state, the UE receives and stores a CN domain specific DRX cycle length, and discontinuously receives the PICH according to the CN domain specific DRX cycle length.

The UE further obtains and uses a DRX cycle length corresponding to its state through system information broadcast by the RRC layer of the UTRAN.

The PICH is a physical channel used for transmitting a Paging Indicator (PI), and has a fixed data rate of SF 256. The PICH is always used in association with an S-CCPCH (Secondary Common Control Physical Channel) to which the PCH (Paging Channel) is mapped.

The UTRAN periodically transmits information including the PI through the PICH to the UE. The UE then periodically checks whether the PICH has a PI related to it. More specifically, the UE in idle state periodically wakes up to check the PICH. If a PI is received through the PICH, the UE receives the S-CCPCH to which the PCH is mapped, to thereby receive corresponding paging information.

The UTRAN periodically transmits system information through a BCH (Broadcast Channel) to the UE. More specifically, the UTRAN transmits an SIB (System Information Block) which is a group of information for constituting a channel and a protocol, using the BCH and transmits information for updating each type of system information to the UE based on the radio environment, which may undergo constant changes.

Figure 7:
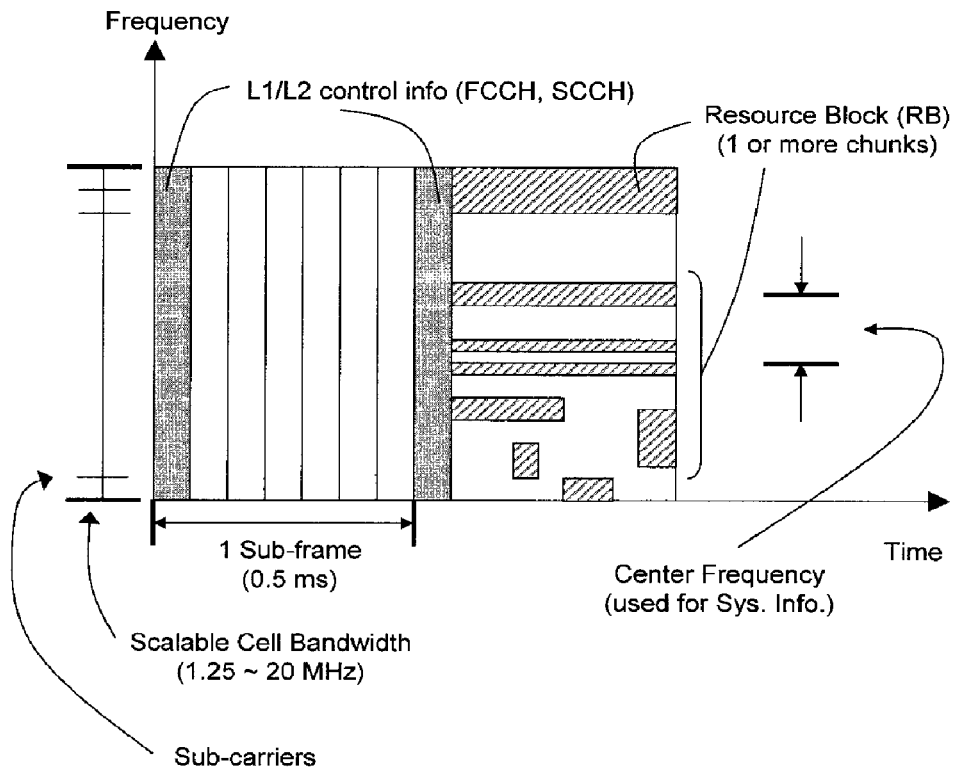
FIG. 7 is a diagram to explain the features of the present invention by showing where the control information and resource blocks may be located within each sub-frame with respect to frequency and time.

FIG. 7 is a diagram to explain the features of the present invention by showing where the control information and resource blocks may be located within each sub-frame with respect to frequency and time.

The structure (format) of a sub-frame in relation to the frequency domain and the time domain can be understood from FIG. 7. Namely, a single sub-frame has a time duration of 0.5 ms with 7 OFDM symbols (portions) therein.

In the first portion of the sub-frame, control information (i.e., L1/L2 control information, FCCH, SCCH, etc.) is included, while resource blocks (RBs) that may be in the form of one or more chunks may be located in the remaining portion of the sub-frame. Here, a resource block may occupy the entire time duration of the sub-frame (excluding the time duration for the control information) or some partial time duration thereof. Also, each resource block (RB) may use a particular frequency range (i.e., a particular number of sub-carriers).

The frequency axis can be referred to as a scalable cell bandwidth, which typically has a frequency range of 1.25~20 MHz. A plurality of sub-carriers exists in the scalable cell bandwidth. Of this frequency range, a so-called center frequency (of approximately 10 MHz) is mainly used in transmitting system information.

In the related art, such system information is considered to be fixed. Although this allows the terminal to easily read the system information, addition of new system information is not possible. In contrast, the present invention allows for at least part of the system information to be flexible (or dynamic).

To do so, the present invention divides (or separates or distinguishes) the system information into primary system information (e.g., Master Information Block: MIB) and non-primary (or secondary) system information (e.g., System Information Block: SIB).

The MIB is transmitted in a static manner (e.g., via a BCH for fixed manner transmission), while the SIB is transmitted in a dynamic manner (e.g., via a downlink SCH for dynamic manner transmission). Here, transmission in a dynamic manner means that different frequency ranges and time durations can be used.

For each frame, the MIB contains information about where each SIB is located. Namely, the particular frequency range (i.e., sub-carriers) and particular time duration (i.e., symbols) for each SIB is specified to allow the terminal (UE) to properly read the appropriate SIBs. For example, the MIB may indicate that a particular UE (e.g., UE #11) should read a particular resource block (e.g., RB #3). Here, the RB #3 can also be expressed as the information located at certain sub-carriers and certain symbols (e.g., at sub-carriers #13~60 and symbols #3~5).

In a similar manner, for each sub-frame within one frame, the control information (located in the first portion) contains information about where each resource block (RB) is located. Namely, the frequency range and particular time duration for each RB is specified to allow the terminal (UE) to properly read the appropriate RBs.

The above concepts generally depicted in FIG. 7 will be explained in more detail in the following description with reference to FIGS. 8 through 12.

Figure 8:
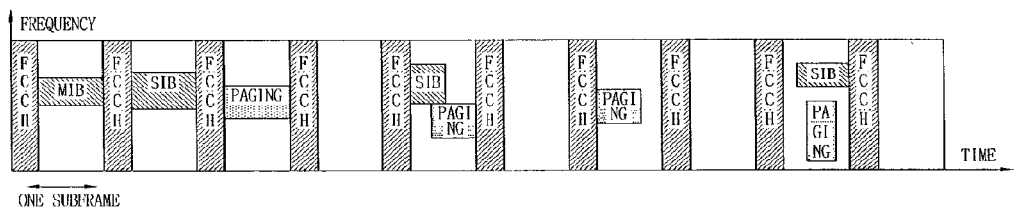
FIG. 8 is a diagram used to explain a control information transmission and reception method according to an exemplary embodiment of the present invention.

FIG. 8 is a diagram used to explain a control information transmission and reception method according to an exemplary embodiment of the present invention. The network transmits a frame control channel (FCCH) at every particular period (i.e., a first period). Hereafter, the particular period is referred to as a frame.

It should be noted that the FCCH may also be described in different terms. Namely, the control information transmitted by the network may be called L1/L2 control information, FCCH, SCCH, or the like. Hereafter, such control information will mostly be referred to as FCCH, merely for the sake of explanation (although control information and SCCH are also described).

As shown in FIG. 8, a MIB (Master Information Block) is repetitively transmitted at every second period, which is different that the above-mentioned first period. The MIB includes scheduling information for a SIB (System Information Block) that transmits system information, a paging message, and a notification message. Namely, the MIB provides scheduling information related to which frequency and what time is used to transmit each type of control information, such as multiple SIBs, multiple paging messages, multiple notification messages, and the like. The second period may set to be greater than the first period. The MIB may be transmitted in the first frame of the period in which the MIB is to be transmitted.

Here, the FCCH that is transmitted in each frame can inform about whether the data transmitted in the corresponding time duration (frame) is a common control message, a control message dedicated for a particular mobile terminal, common data, or data dedicated for a particular mobile terminal. Also, the FCCH informs about which frequency and what time within the frame that a control message or data of the control information is transmitted.

The mobile terminal periodically receives the FCCH at every first period. If the FCCH of a particular frame indicates the transmission of a MIB, the mobile terminal receives the MIB at the corresponding frequency and time in accordance with the scheduling information included in the indicator information transmitted through the FCCH. By referring to the MB, the mobile terminal can obtain scheduling information for particular paging messages, particular notification messages, particular indicator messages, and the like. Through such scheduling information, the mobile terminal can determine which frequency and what time was used to transmit a particular SIB, a particular paging message, a particular notification message or the like. According to such scheduling information, the mobile terminal can receive a notification message with respect to the SIB, the paging message, and the subscribed service that is should receive.

The MIB may include either a mobile terminal identifier or a service identifier, or may include an indicator that indicates such an identifier.

Figure 9:
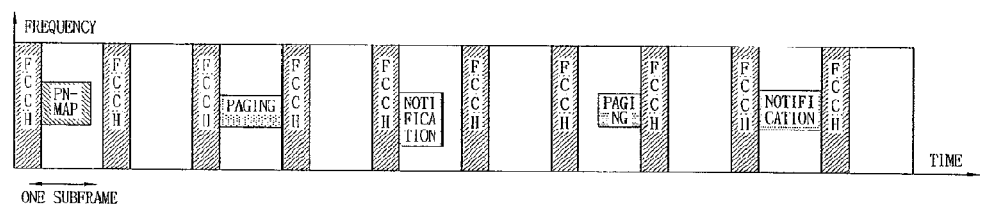
FIG. 9 is a diagram used to explain a control information transmission and reception method according to another exemplary embodiment of the present invention.

FIG. 9 is a diagram used to explain a control information transmission and reception method according to another exemplary embodiment of the present invention. Referring to FIG. 9, the network periodically transmits a PN-MAP (i.e., a Paging and Notification MAP) that informs about indicator information for a paging message or a notification message, and about scheduling information. Here, the PN-MAP may be labeled differently. Namely, the PN-MAP is merely one type of L1/L2 control information that may be transmitted by the network. In fact, an MIB may be used instead of the PN-MAP in order to provide information about paging or notification messages and about scheduling.

Also, it can be understood that paging is provided on a per UE (terminal) basis, while notification is provided on a per service basis. Thus, the concepts related to paging with respect to UEs, can be applied to notification with respect to services.

The PN-MAP may be transmitted during the first frame of a paging period or of a notification period. Here, the paging period and the notification period may be the same or may be different. The FCCH that is transmitted in each frame indicates whether the data transmitted in the corresponding time duration (frame) is a paging message, a notification message, or a PN-MAP. Also, the FCCH informs about the scheduling information that indicates which frequency and what time within the frame that each message or data of the control information is transmitted.

The mobile terminal receives the PN-MAP at every paging period or at every notification period. Here, the mobile terminal can determine whether or not a corresponding frame contains a PN-MAP upon receiving the FCCH. Accordingly, the mobile terminal obtains the PN-MAP via the corresponding frame only when the transmission of the PN-MAP is informed by the FCCH.

By using the received PN-MAP, the mobile terminal obtains the scheduling information of a particular paging message or a particular notification message. The mobile terminal uses the scheduling information to determine which frequency and what time the particular paging message or the particular notification message was transmitted. The mobile terminal can receive its corresponding paging message according to the determined transmission information, and can receive a notification message with respect to the service it subscribed to. The PN-MAP may include either a mobile terminal identifier or a service identifier, or may include an indicator that indicates such an identifier.

Figure 10:
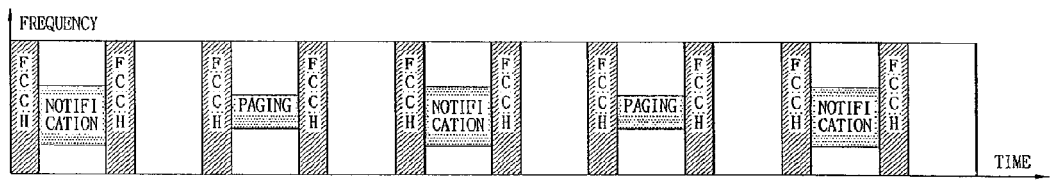
FIG. 10 is a diagram used to explain a control information transmission and reception method according to another exemplary embodiment of the present invention.

FIG. 10 is a diagram used to explain a control information transmission and reception method according to another exemplary embodiment of the present invention. Referring to FIG. 10, the network transmits a paging message or a notification message of multiple mobile terminals at every paging period. A paging message (for a particular mobile terminal), which is transmitted during one paging period, is transmitted through a particular frame that is mapped to an identifier of the mobile terminal. Also, a notification message (for a particular service), which is transmitted during one notification period, may be transmitted through a particular frame that is mapped to an identifier of the service. Here, the paging period and the notification period may be the same or may be different. The FCCH that is transmitted in each frame indicates whether the data transmitted in the corresponding time duration (frame) is a paging message or a notification message. Also, the FCCH informs about which frequency and what time within the frame that each message or data is transmitted.

The mobile terminal periodically receives (according to the paging period) a particular frame that is mapped to its identifier, in order to obtain a paging message for itself. Also, the mobile terminal periodically receives (according to the notification period) a particular frame that is mapped to an identifier of a service it wishes to receive, in order to obtain a notification message for the service. Here, before receiving the particular frame, the mobile terminal receives the FCCH of the corresponding frame, and only if the FCCH indicates the transmission of the paging message or the notification message, the paging message or the notification message is obtained via the frame.

Accordingly, it can be said that the L1/L2 control information (i.e., system information, MIB, PN-MAP, etc.) serves the purpose of a PICH. Namely, a UE can monitor the L1/L2 control information to determine the location of a particular resource block (RB) with respect to the time and frequency domains in order to obtain the necessary paging message.

Figure 11:
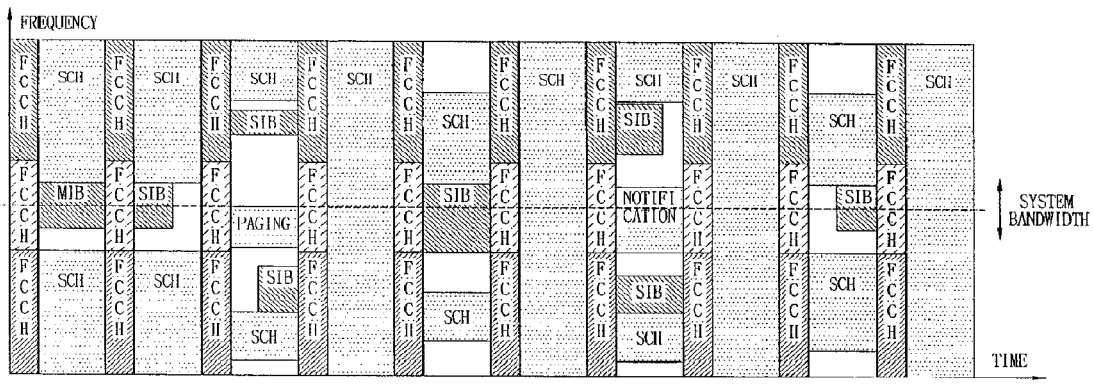
FIG. 11 is a diagram used to explain a control information transmission and reception method according to another exemplary embodiment of the present invention.

FIG. 11 is a diagram used to explain a control information transmission and reception method according to another exemplary embodiment of the present invention. A cell that supports broadband frequencies with a bandwidth of 10 or 20 MHz, can provide a system bandwidth of narrowband frequencies for a mobile terminal operating in narrowband frequencies such as 1.25 MHz, 2.5 MHz, or the like. In this case, as shown in FIG. 11, a central bandwidth of the broadband frequencies is typically used for the system bandwidth. Here, the MIB or PN-MAP, the paging messages, the notification messages, the SIBs, and the like should all be transmitted in the system bandwidth. However, SIBs that transmit particular system information may be transmitted outside of the system bandwidth.

The FCCH (or other type of system information like L1/L2 control information, SCCH, etc.) transmitted in each frame indicates whether the data transmitted in the corresponding time duration (frame) is a MIB or PN-MAP, a paging message, a notification message, an SIB, or the like. Also, the FCCH informs about which frequency and what time within the frame that each message or data is transmitted. The FCCH may be transmitted upon being divided into an FCCH for system bandwidth and an FCCH for non-system bandwidth. Accordingly, a mobile terminal that only receives the system bandwidth may receive the FCCH for system bandwidth to obtain information of each data or message that is transmitted via the system bandwidth. Also, a mobile terminal that receives the non-system bandwidth may receive the FCCH for non-system bandwidth to obtain information of each data or message that is transmitted via the non-system bandwidth.

In other words, the concepts shown in FIG. 11 are for handling the situation for mobile terminals in idle mode.

The network (system) supports the cell bandwidth of 20 MHz, while a mobile terminal typically can only support a 10 MHz bandwidth range. Thus, the L1/L2 control information needs to be transmitted in certain units (a frequency range) such as, a range of 10 MHz, 5 MHz, or the like. As a result, there may be three scenarios for the frequency ranges used by the mobile terminal for reading data. Namely, of the 20 MHz scalable cell bandwidth, the mobile terminal may read one of three frequency ranges, i.e., the lower 10 MHz, the upper 10 MHz, or a middle (intermediate) 10 MHz thereof.

For mobile terminals in RRC connected mode, because the particular cell in which the connected mode mobile terminal is located is known, any one of the three 10 MHz ranges and appropriate switching among these three 10 MHz ranges is possible. However, for a mobile terminal in idle mode, because the particular cell in which the terminal is located cannot be known, only one of these three 10 MHz ranges can be used (typically, the intermediate 10 MHz range is used). Meanwhile, the bandwidth outside the intermediate 10 MHz range can be used for transmitting and receiving resource blocks for mobile terminals in connected mode.

Here, although the above exemplary embodiment with reference to FIG. 11 is described for 10 MHz ranges, it is contemplated that the 20 MHz scalable cell bandwidth could also be divided up into 5 MHz units.

Figure 12:
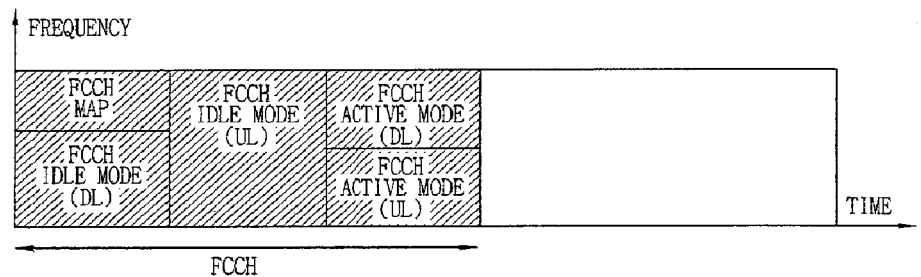
FIG. 12 is a diagram used to explain constituting information of an FCCH according to an exemplary embodiment of the present invention.

FIG. 12 is a diagram used to explain constituting information of control information (i.e., an FCCH) according to an exemplary embodiment of the present invention. The FCCH provides to the mobile terminal, various types of control information related to data and control messages transmitted during the corresponding period (i.e., during the corresponding frame). Here, the FCCH is shown to be comprised of five different FCCH portions. However, this is merely exemplary, and the number of FCCH portions may vary accordingly.

Referring to FIG. 12, the first FCCH portion is a FCCH MAP that informs about the frequency and time of the FCCH transmission, a length of the FCCH information, radio resource parameters needed for receiving the FCCH information, and the like. Such FCCH MAP may be always included in each frame. In the present invention, each frame may include all types of FCCH or may include only portions thereof. The FCCH MAP may inform about whether or not the remaining four types of FCCH portions (excluding the FCCH MAP) are transmitted in the corresponding frame.

The second FCCH portion is a FCCH Idle Mode (DL) that includes control information needed on order to receive downlink control information when the mobile terminal is in idle mode. This second FCCH portion may be included in a corresponding frame when control information to be transmitted on the downlink exists in the frame. The control information related to common control messages such as the MIB, SIB, paging message, notification message, PN-MAP, etc. may be included in this second FCCH portion. Also, the MIB, SIB, paging message, notification message, PN-MAP, etc. may be included in this second FCCH portion.

The third FCCH portion is a FCCH Idle Mode (UL) that includes control information needed in order to transmit uplink control information when the mobile terminal is in idle mode. This third FCCH portion may include information that is needed for uplink random access transmissions. When the mobile terminal transmits a random access message, the network may transmit a response to the ransom access message via this third FCCH portion. Also, the third FCCH portion can be used to inform that a response to the random access message is being transmitted in the frame that is used to transmit the third FCCH portion, and to do so, the third FCCH portion includes control information related to such response to the random access message.

The fourth FCCH portion includes control information needed in order to receive downlink control information when the mobile terminal is in active mode. This fourth FCCH portion may include control information of an downlink shared channel (SCH) that is transmitted in a corresponding frame.

The fifth FCCH portion includes control information needed in order to transmit uplink control information when the mobile terminal is in active mode. This fifth FCCH portion may include control information of an uplink shared channel (SCH) that is transmitted in a corresponding frame.

The mobile terminal periodically receives the FCCH MAP and may check to see whether the corresponding frame contains any data or information that is wishes to receive. After receiving the FCCH MAP, when the mobile terminal is in idle mode, only the second and third FCCH portions are received. When the mobile terminal is in active mode, only the fourth and fifth FCCH portions are received.

In order to inform about the control information that is needed for multicast and broadcast transmissions, the network may add and transmit other FCCH portions as needed.

It should be noted that FIGS. 1 through 12 show exemplary embodiments for a 10 ms frame having twenty 0.5 ms subframes. However, the features of the present invention are clearly applicable to other techniques that employ other frame sizes. For example, a frame size of 5 ms may be used, and to support LTE (Long Term Evolution) techniques, a frame size of 0.5 ms may be used.

Regarding the effects of the present invention, the wireless network can, in advance, inform (through a single indicator channel) about the transmission of common control information (such as particular paging messages, notification messages, system information, or the like). A radio mobile terminal can periodically receive the single indicator channel to thus receive the common control information by using the control information of the indicator channel. By using such procedures, the operations of the mobile terminal may be simplified and the mobile terminal resources can be more efficiently used.

Additionally, as the present invention provides information about where each resource block (RB) is located with respect to the frequency and time domains, system information, control information, and the like can be processed in a dynamic and flexible manner, to thus support various enhanced capabilities. Also, when frequency selective scheduling is performed, improved adaptation to channel changes can be achieved.

The present disclosure provides a method of reception of paging information for a mobile terminal in a mobile communications system, the method comprising: receiving control information in a periodic manner; if the received control information is relevant to the mobile terminal, receiving paging information using scheduling information that indicates time and frequency information of the paging information.

The control information includes either a mobile terminal identifier or a service identifier, or an indicator that indicates a mobile terminal identifier or service identifier. The received control information and paging information are in the same sub-frame. The method further comprising: receiving primary system information in a static manner, the primary system information containing the scheduling information that is used for receiving the paging information; and receiving non-primary system information in a dynamic manner, the non-primary information containing the control information. The scheduling information indicates at least one of a time characteristic and a frequency characteristic of the non-primary system information. The time characteristic and the frequency characteristic indicate a location of the non-primary system information to be read by the particular terminal. The primary system information further comprises an indicator for indicating a particular terminal. The indicator comprises: at least one of a terminal identifier, a service identifier, and a logical channel identifier. The time characteristic relates to symbols and the frequency characteristic relates to sub-carriers. The paging information is in the form of at least one resource block. The control information related to paging and notification, and other resource blocks are received via a center frequency among broadband frequencies used for a system bandwidth. The control information is for a mobile terminal in idle mode.

Also, the present disclosure provides a method of downlink transmission of paging information for a mobile terminal in a mobile communications system, the method comprising: transmitting control information in a dynamic manner to a group of cells, wherein the control information comprises scheduling information that indicates time and frequency information; and transmitting paging information according to the control information.

The control information includes either a mobile terminal identifier or a service identifier, or an indicator that indicates a mobile terminal identifier or service identifier. The transmitted control information and paging information are in the same sub-frame. The group of cells is related to a tracking area. The method further comprising: receiving primary system information in a static manner, the primary system information containing the scheduling information that is used for receiving the paging information; and receiving non-primary system information in a dynamic manner, the non-primary system information containing the control information. The scheduling information indicates at least one of a time characteristic and a frequency characteristic of the non-primary system information. The time characteristic and the frequency characteristic indicate a location of the non-primary system information to be read by the particular terminal. The primary system information further comprises an indicator for indicating a particular terminal. The indicator comprises: at least one of a terminal identifier, a service identifier, and a logical channel identifier. The time characteristic relates to symbols and the frequency characteristic relates to sub-carriers. The paging information is in the form of at least one resource block. The control information related to paging and notification, and other resource blocks are received via a center frequency among broadband frequencies used for a system bandwidth. The control information is for a mobile terminal in idle mode.

Additionally, the present disclosure provides a method for processing system information for a mobile terminal, the method comprising: receiving primary system information in a static manner; receiving non-primary system information in a dynamic manner based on the primary system information, the non-primary system information comprising control information that includes separate information for idle mode and active mode; and reading actual data by using the received control information according to whether the mobile terminal is operating in idle mode or active mode. The static primary system information includes scheduling information that indicates time and frequency information of the non-primary system information.

Furthermore, the present disclosure provides a method for processing system information for a network, the method comprising: transmitting primary system information in a static manner; transmitting non-primary system information in a dynamic manner based on the primary system information, the non-primary system information comprising control information that includes separate information for idle mode and active mode; and transmitting actual data to be read by a mobile terminal that uses the control information according to its operation in idle mode or active mode. The static primary system information includes scheduling information that indicates time and frequency information of the non-primary system information.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of transmitting a control message at a network in a mobile communication system, the method comprising:
   transmitting control information on a single control channel to at least one user equipment to inform the at least one user equipment of transmission of at least one control message of one type among at least two types of control messages, the control information comprising scheduling information for the at least one control message,
   wherein:
      the at least one control message and the scheduling information are transmitted during a same sub-frame;
      the scheduling information comprises information related to where each resource block (RB) is located in a specific domain having time and frequency;
      a first type of the at least two types of control messages is a system information message and a second type of the at least two types of control messages is related to a paging message;
      the control information further comprises indication information that indicates whether the at least one control message is the first type or the second type; and
      the indication information is a specific identifier that informs the at least one user equipment that an upcoming transmission on a shared channel is the first type control message when the first type control message will be transmitted on the shared channel, and that informs the at least one user equipment that the upcoming transmission on the shared channel is the second type control message when the second type control message will be transmitted on the shared channel; and
   transmitting the at least one control message, which is the first type or the second type as indicated by the control information, to the at least one user equipment, wherein system information of the system information message is divided into primary system information and non-primary system information, and wherein the primary system information is transmitted statically via a broadcast channel and the non-primary system information is transmitted dynamically via the shared channel.

2. The method of claim 1, wherein the control information is transmitted periodically with a first period.

3. A method of receiving a control message at a user equipment in a mobile communication system, the method comprising:

receiving control information on a single control channel from a network, the control information indicating transmission of at least one control message of one type among at least two types of control messages, wherein:
the control information comprises scheduling information for the at least one control message;
the at least one control message and the scheduling information are received during a same sub-frame;
the scheduling information comprises information related to where each resource block (RB) is located in a specific domain having time and frequency;
a first type of the at least two types of control messages is a system information message and a second type of the at least two types of control messages is related to a paging message;
the control information further comprises indication information that indicates whether the at least one control message is the first type or the second type; and
the indication information is a specific identifier that informs the at least one user equipment that an upcoming transmission on a shared channel is the first type control message when the first type control message will be transmitted on the shared channel, and that informs the at least one user equipment that the upcoming transmission on the shared channel is the second type control message when the second type control message will be transmitted on the shared channel; and receiving, from the network, the at least one control message, which is the first type or the second type as indicated by the control information, wherein system information of the system information message is divided into primary system information and non-primary system information, and wherein the primary system information is transmitted statically via a broadcast channel and the non-primary system information is transmitted dynamically via the shared channel.

4. The method of claim 3, wherein the control information is received periodically with a first period.

5. An apparatus for transmitting a control message in a mobile communication system, the apparatus comprising:
a transmitter configured to:
transmit control information on a single control channel to at least one user equipment to inform the at least one user equipment of transmission of at least one control message of one type among at least two types of control messages, the control information comprising scheduling information for the at least one control message,
wherein:
the at least one control message and the scheduling information are transmitted during a same sub-frame;
the scheduling information comprises information related to where each resource block (RB) is located in a specific domain having time and frequency;
a first type of the at least two types of control messages is a system information message and a second type of the at least two types of control messages is related to a paging message;
the indication information is a specific identifier that informs the at least one user equipment that an upcoming transmission on a shared channel is the first type control message when the first type control message will be transmitted on the shared channel, and that informs the at least one user equipment that the upcoming transmission on the shared channel is the second type control message when the second type control message will be transmitted on the shared channel; and transmit the at least one control message, which is the first type or the second type as indicated by the control information, to the at least one user equipment, wherein system information of the system information message is divided into primary system information and non-primary system information, and wherein the primary system information is transmitted statically via a broadcast channel and the non-primary system information is transmitted dynamically via the shared channel.

6. The apparatus of claim 5, wherein the control information is transmitted periodically with a first period.

7. An apparatus for receiving a control message in a mobile communication system, the apparatus comprising:
a receiver configured to:
receive control information on a single control channel from a network, the control information indicating transmission of at least one control message of one type among at least two types of control messages,
wherein:
the control information comprises scheduling information for the at least one control message;
the at least one control message and the scheduling information are received during a same sub-frame;
the scheduling information comprises information related to where each resource block (RB) is located in a specific domain having time and frequency;
a first type of the at least two types of control messages is a system information message and a second type of the at least two types of control messages is related to a paging message;
the control information further comprises indication information that indicates whether the at least one control message is the first type or the second type; and
the indication information is a specific identifier that informs the at least one user equipment that an upcoming transmission on a shared channel is the first type control message when the first type control message will be transmitted on the shared channel, and that informs the at least one user equipment that the upcoming transmission on the shared channel is the second type control message when the second type control message will be transmitted on the shared channel;
and
receive, from the network, the at least one control message, which is the first type or the second type as indicated by the control information, wherein system information of the system information message is divided into primary system information and non-primary system information, and wherein the primary system information is transmitted statically via a broadcast channel and the non-primary system information is transmitted dynamically via the shared channel.

8. The apparatus of claim 7, wherein the control information is transmitted periodically with a first period.

* * * * *